C. Mitzelfeld,
Saw.
No. 106,187. Patented Aug. 9, 1870.
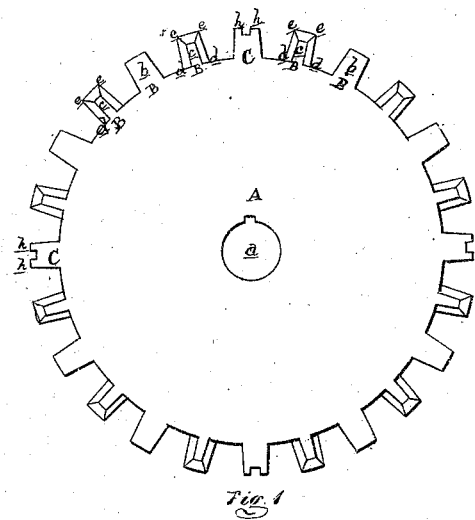
Fig. 1
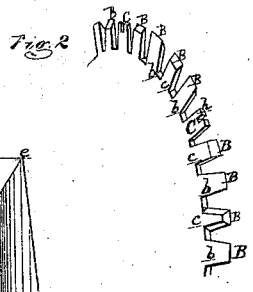
Fig. 2
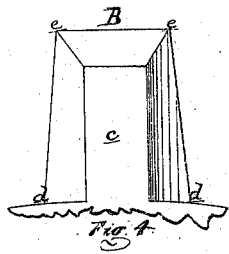
Fig. 4
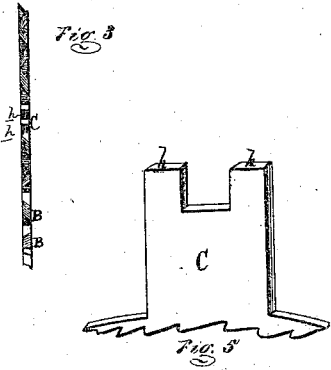
Fig. 3
Fig. 5
ATTEST
Frederick Ebuts
Samuel J. Spray
INVENTOR
Charles Mitzelfeld
Per Attorney
Thos. J. Sprague

United States Patent Office.

CHARLES MITZELFELD, OF DETROIT, MICHIGAN, ASSIGNOR TO HIMSELF AND MARK FLANIGAN, OF SAME PLACE.

Letters Patent No. 106,187, dated August 9, 1870.

IMPROVEMENT IN SAWS.

The Schedule referred to in these Letters Patent and making part of the same.

*To whom it may concern:*

Be it known that I, CHARLES MITZELFELD, of Detroit, in the county of Wayne and State of Michigan, have invented a new and useful Improvement in Circular Cross-cut and Splitting Saws; and I do declare that the following is a true and accurate description thereof, reference being had to the accompanying drawing and to the letters of reference marked thereon, and being a part of this specification.

The nature of this invention relates to an improvement in circular saws, so constructing them that they will operate equally well in splitting as in cross-cutting, that they will clear themselves under all circumstances, and that they will leave the lumber as smooth as though the same had been planed off.

The invention consists in giving to the sides of the teeth a chisel-shaped edge, as well as the edge, said teeth being beveled or made chisel-shaped on the two edges and top, and in combining therewith certain clearing-teeth, so arranged, relative to the cutting-teeth, that the sawdust or cuttings will at all times be cleared out; also, in a combination of the two devices for the purposes herein mentioned.

Figure 1 is a plan view of my saw.
Figure 2 is a sectional perspective.
Figure 3 is an edge view.
Figures 4 and 5 are enlarged views of the cutting and clearing-teeth.

Like letters refer to like parts in each figure.

In the accompanying drawing—

A represents a circular-saw plate, provided with the usual hole *a* through its center, to receive the mandrel or arbor upon which it rotates.

B is a series of saw-teeth, gummed, cut, filed, or otherwise made in the periphery of said plate.

The backs *b* of the teeth are upon the same plane with the face of said plate.

The opposite sides of these teeth, lettered *c*, are beveled or made chisel-shaped on both edges, from the base *d* to the top *e*, and also across the top from *e* to *e*, or, in other words, the form is that of a tooth having two rectangular corners, flat on its rear side, and sharpened upon each of its edges on the front side, and arranged so that alternating teeth are cut upon alternate sides.

C are clearing-teeth, preferably a trifle shorter than the cutting-teeth. They are of the same thickness as the saw-blade, and their tops terminate in fingers or spurs *h*, carried up of a uniform thickness. A sufficient number of these teeth is employed to effectually clear all sawdust or cuttings from the saw-kerf.

The cutting-teeth B may be "set" alike, if deemed desirable, although not necessary to their successful working. The spaces between the teeth are about equal to the width of one of the teeth.

I am aware that saws are now in use provided with chisel-shaped teeth at their points, which are employed for cross-cutting. The only objection to them for that purpose is that they choke, there being no way provided for clearing out the sawdust or cuttings. These saws are entirely useless for slitting or splitting purposes, where the cutting is done in the direction of the fiber of the wood.

The giving the teeth a prismatic form, or beveling the edges as well as the top to a chisel cutting-edge, enables this saw to work equally as well in splitting as in cross-cut sawing, the edges forming planes which finish the cut upon both sides as smoothly as though the surfaces of the lumber had been planed off in a supplementary finishing, while the clearing-teeth effectually throw out all dust or cuttings.

I therefore do not claim a saw with a tooth made chisel-shaped at its end; but

What I do claim as my invention, and desire to secure by Letters Patent, is—

1. The teeth B, constructed as described and shown, and as and for the purposes set forth.

2. In circular saws, the combination of the cutting-teeth B and clearing-teeth C, when constructed in the form, and operating substantially as and for the purposes herein set forth, shown, and specified.

CHARLES MITZELFELD.

Witnesses:
SAM. J. SPRAY,
FREDERICK EBERTS.